United States Patent Office 3,035,975
Patented May 22, 1962

3,035,975
STABLE AQUEOUS MEDICINAL SOLUTIONS
Hans Voigt, Oraniendamm 44, Berlin-
Waidmannslust, Germany
No Drawing. Filed Jan. 22, 1958, Ser. No. 710,407
Claims priority, application Germany June 24, 1957
10 Claims. (Cl. 167—65)

This invention relates to the manufacture of stable pharmaceutical solutions from aqueous dissolved plant extracts. It is directed particularly to the accomplishment thereof by adding to the solution, water-soluble salts of the metals of the lanthanide group of metals which are capable of change in valence, and alpha-hydroxypropionic acid, $CH_3.CH(OH).COOH$ (lactic acid).

Pharmaceutical solutions which contain plant extracts are frequently not sufficiently stable. Aqueous solutions of plant extracts are especially subject to decomposition due to attack by molds, or fungi, fermentation agents and putrefaction agents.

Such decomposition can be prevented by adding, according to the invention, an aqueous solution of a water-soluble salt of a metal of the lanthanum group capable of change in valence, preferably those having the lower ordinal numbers or concentration factors are added, due to the good water-solubility and the pronounced lack of toxicity of these substances. However, the admixture of such metal salts is not sufficient to obtain the desired stability since the salts may cause cloudiness and precipitation in the obtained mixture of the solution whereby the appearance of the solution and also the uniformity of the distribution of the ingredients within the mixture are adversely affected. Furthermore, the insolubility of the precipitates reduces the activity of the pharmaceutical product.

To prevent such precipitation or to redissolve the precipitations as they occur, lactic acid is added, according to the invention, in addition to the aforedescribed metal salt of the lanthanide group. The lactic acid is capable of removing the cloudiness and precipitations, or of preventing such cloudiness and precipitations if the lactic acid is added in advance. By an excess of lactic acid, the vegetable active ingredients soluble in the acid environment are kept in solution so that even if there be any slight precipitation, the pharmaceutically important active ingredients are not present therein, and therefore, are not lost in the event a filtration is subsequently necessary or advisable. The filtrate contains all the active ingredients and is stable for a practically unlimited period.

In the event that the aqueous pharmaceutical solution contains a certain percentage of alcohol to which are added water-soluble salts, cloudiness and precipitations of alcohol-containing solutions are prevented or removed by the addition of lactic acid.

The compatibility of the pharmaceutical solution made stable by the method of the invention is not adversely affected by the added substances. Inasmuch as the lactic acid has a neutral acidic taste, the finished preparation is without side taste and without side odor. The chlorides of the aforesaid members of lanthanum group are odorless and also tasteless in the added small quantity.

As has been stated, pharmaceutical solutions of aqueous plant extracts have a low stability, especially pharmaceutical solutions made of plant extracts which are administered by drops, such as is the case for heart drugs. It is especially important in such cases to increase the stability. According to the invention, the stability, for example, of a solution of the plant extracts, as for example, extractum Crataegi and lactic acid is increased by adding a salt of the class mentioned, as for example, a cerium salt dissolved in water.

The addition of such a salt, as the cerium salt, which is capable of changing in valence has, in addition to the effect of increasing the stability of the plant extract solution, the advantage that it is active as an oxygen transmitter. This is due to the fact that it is capable of absorbing and releasing oxygen by reason of the change in valence during the intermediary exchange in substance.

The presence of lactic acid which is an energy producing substance germane to the heart muscle, in conjunction with the cerium salt, effects a very pronounced increase of the stability of a pharmaceutical solution which produces a highly cardioactive effect and which is produced from an aqueous solution of extractum Crataegi. If the order of the mixture is such that to the aqueous solution of extractum Crataegi first the lactic acid component and then the aqueous solution of cerium salt is added, any precipitation or cloudiness adversely affecting the cardiac activity are avoided even if the pharmaceutical solution is packed in bulk and used after a very long period of storage. The pharmaceutical solution remains fully effective after a storage of several months.

Salts of the aforesaid lanthanide metals have been found to possess a highly bactericidal effect which is desirable for aqueous solutions of plant extracts, especially for solutions of extractum Crataegi. The cerium salt being one of trivalent cerium is especially advantageous because it is very readily soluble and the stability of the trivalent cerium, in an acid solution, as it is formed by the addition of lactic acid is again preserved. The trivalent cerium salt is water clear and hence does not cause any discoloration of the pharmaceutical solution. The effect of both additions is cumulative in relation to the desired stability of the pharmaceutical solution. The cerium salt is controlling for the microbiological stability of the plant extract solution and the lactic acid is controlling for the physical stability of the solution; that is, for the continuing clarity of the cerium salt solution in mixture with the plant extract solution so that only by a joint use of both additions the pharmaceutical solution is fully stabilized.

Cerous-chloride, $CeCl_3$, shows good bactericidal activity. It is readily soluble in water and can hence be conveniently admixed to the solution of the Crataegus extract.

In place of cerous-chloride, all other water-soluble cerium salts (cerous or ceric, i.e., cerium (III) or cerium (IV)) of the mineral and organic acids may be used, for example, cerium nitrate, cerium acetate, and cerium lactate, cerium sulfate, cerium phosphate, cerium (IV) ammonium sulfate, cerium (IV) ammonium nitrate, cerium ascorbate, cerium salts of amino acids such as cystine, cerium salts of p-amido benzene sulfonic acid, etc. may be mentioned.

The corresponding salts of other metals of the class mentioned may be used, as for example, praseodymium (Pr), samarium (Sm), europium (Eu), terbium (Tb) and ytterbium (Yb).

Cerium is the least expensive of the metals of the members of the lanthanum group aforesaid which are capable of changes in valence. Accordingly cerium salts are the preferred metal salts. They are commercially available mostly with slight admixtures of praseodymium and other salts of metals of the lanthanum group. Hence it is not necessary to employ chemically pure cerium salts for preparing the solutions of the metal salts. The water-soluble salts of cerium can be replaced by water-soluble salts of praseodymium or terbium or ytterbium.

The plant extracts which can be used are: among the heart active drugs; the extract of Crataegus, extractum Digitalis, extractum Strophanti, extractum Oleandri, extractum *Adonis vernalis*; furthermore the extracts of *Conballaria majalis*, bulbus Scillae and the extractum *Cacti grandi floris*, furthermore these which act on the blood vessels of the heart such as extract of fructus *Ammei visnaga*, that which contains spasmolytic acting alkaloids khellin and khellinin; further, those which act on the varicose symptom complexes such as extractum Hippocastani and further plant extracts with diuretic action, for example extractum Equiseti and extractum Juniperi.

In the same manner the active ingredients isolated from the aforementioned drugs can be used.

It will be noted that the aforesaid plant extracts are those which are used as heart agents and circulation agents.

In carrying out this invention, there may be used either the aqueous extract (sicum or spissum i.e., powdered extract or pillular extract, respectively) or the alcoholic extract of the plant. The lactic acid effectuates clarification of the aqueous solution of the extract (siccum or spissum) so that a cheaper and relatively concentrated alcoholic extract of the active material is useful in preparing aqueous solutions thereof which are devoid of cloudiness.

In general, the stable pharmaceutical aqueous preparations of this invention contain about 2 to 20% of the plant extract, related to the dry weight of the same, about 5 to 50% of lactic acid, and about 0.01 to 10% of a water soluble salt of a metal of the lanthanum group capable of change in valence.

In general the method of manufacturing the stable aqueous pharmaceutical solutions of this invention is: first, the plant extract is dissolved in water, then, the lactic acid is added, then, the aqueous solution of the aforesaid metal salt of the Lanthanum group is added, and the components are thereupon mixed and the dissolved mixture is clarified, as by centrifuging or filtration.

The following are examples in accordance with the invention, wherein the weights are in grams (g.):

*Example 1*

To produce a pharmaceutical solution having a mass of 10,000 grams, 400 g. of extractum Crataegi are dissolved in 3,600 g. of distilled water, and 3,000 of 80% lactic acid are added thereto. The solution containing the extractum Crataegi and lactic acid is added to 1,920 g. of distilled water to which has previously been added 80 g. of cerous chloride. Then 1,000 g. of distilled water are added to the aforedescribed combined solutions. The solution, prepared by the dissolution of the ingredients in the aforedescribed sequence is then filtered to produce a germ free product.

In lieu of the extractum Crataegi there may be used extractum Digitalis, extractum Strophanti, extractum Oleandri, extractum *Adonis vernalis;* extracts of *Conballaria majalis,* bulbus Scillae, extractum *Cacti grandi floris,* extracts of fructus *Ammei Visnaga,* further, those which act on the varicose symptom complexes such as extractum Hippocastani and extractum Equissti and extractum Juniperi.

In place of the cerous chloride there may be used cerium nitrate, cerium acetate, cerium lactate, cerium sulfate, cerium phosphate, cerium (IV) ammonium sulfate, cerium (IV) ammonium nitrate, cerium ascorbate, cerium salts of amino acids such as cystine, and cerium salts of p-amido benzene sulfonic acid. These cerium salts may be cerous or ceric salts.

In the place of the aforedescribed salts of cerium there may be used the corresponding salts of metals such as praseodymium (Pr); samarium (Sm), europium (Eu), terbium (Tb) and ytterbium (Yb).

*Example 2*

600 g. of extractum Crataegi in relation to the dry substance, are dissolved in 9,400 g. of water, 100 g. of a cerous chloride in relation to the salt devoid of water of crystallization, are dissolved in 3,900 g. of water. 6,000 g. of 80% lactic acid in accordance with the requirements of DAB VI are added to the aqueous plant extract solution and then the 4,000 g. of the metal salt solution are added. One obtains 20,000 g. of completed mixed preparation which contains 3% of extractum crataegi, 0.5% of cerous chloride and 24% of lactic acid.

Instead of the cerous chloride there may be used, as described in Example I, other salts of cerium, or the corresponding salts of the other mentioned metals of the lanthanum group, or the other plant extracts as described in Example I.

It will be understood that the foregoing description of the invention and the examples set forth are merely illustrative of the principles thereof. Accordingly the appended claims are to be construed as defining the invention within the full spirit and scope thereof.

What is claimed is:

1. A stable pharmaceutical composition comprising an aqueous solution containing a plant extract used in cardio-vascular therapy, lactic acid and a water soluble salt of a metal of the lanthanide group, said metal being capable of change in valence.

2. A stable pharmaceutical composition comprising an aqueous solution of extractum Crataegi used in cardio-vascular therapy, lactic acid and a water soluble salt of a metal of lanthanide group, said metal being capable of change in valence.

3. A stable pharmaceutical composition comprising an aqueous solution of extractum Crataegi used in cardio-vascular therapy, lactic acid and a water soluble salt of cerium.

4. A stable pharmaceutical composition comprising an aqueous solution of extractum Crataegi used in cardio-vascular therapy, lactic acid and cerous chloride ($CeCl_3$).

5. A stable pharmaceutical composition comprising an aqueous solution of extractum Crataegi used in cardio-vascular therapy, lactic acid and cerous nitrate $$(Ce(No_3)_3)$$

6. A stable pharmaceutical composition comprising an aqueous solution of extractum Crataegi used in cardio-vascular therapy, lactic acid and cerous acetate $$Ce(OOC.CH_3)_3$$

7. A stable pharmaceutical composition comprising an aqueous solution containing approximately: from 2 percent to 20 percent of an aqueous solution of extractum Crataegi used in cardio-vascular therapy, from 0.1 percent to 5 percent of a solution of a water soluble salt of a metal of the lanthanide group, said metal being capable of change in valence, and 5 percent to 50 percent of lactic acid.

8. A stable pharmaceutical composition comprising an aqueous solution containing approximately: from 2 percent to 20 percent of an aqueous solution of extractum Crataegi used in cardio-vascular therapy, from 0.1 percent to 5 percent of a solution of a water soluble cerium salt and 5 percent to 50 percent of lactic acid.

9. A stable pharmaceutical composition comprising an aqueous solution containing approximately: from 2 percent to 20 percent of an aqueous solution of extractum Crataegi used in cardio-vascular therapy, from 0.1 percent to 5 percent of cerous chloride solution, and 5 percent to 50 percent of lactic acid.

10. Method of preparing a stable pharmaceutical composition comprising an aqueous solution of a plant extract which comprises adding to water a solution of the plant extract used in cardio-vascular therapy, lactic acid and an aqueous solution of a water soluble salt of a metal of the lanthanide group, said metal being capable of change in valence.

References Cited in the file of this patent

UNITED STATES PATENTS

| | | |
|---|---|---|
| 2,236,970 | Goldfarb | Apr. 1, 1941 |
| 2,390,575 | Dyas | Dec. 11, 1945 |

FOREIGN PATENTS

| | | |
|---|---|---|
| 1,078,741 | Germany | Mar. 31, 1960 |

OTHER REFERENCES

Gray: "Manual of Botany," 8th ed., Am. Book Co., 1950, pp. 1593–1594.

Hocking: "A Dictionary of Terms in Pharmacognosy," Chas. C. Thomas, 1955, p. 62, right hand column.

Horsfall: "Fungicides and Their Action," Chronica Botanica Co., 1945, p. 108, 3rd paragraph.

Reddish: "Antiseptics, Disinfectants, Fungicides and Chemical and Physical Sterilization," Lea and Febiger, 1954, pp. 569–572, esp. p. 569, 5th paragraph.